United States Patent
Xu

(10) Patent No.: US 10,594,151 B2
(45) Date of Patent: Mar. 17, 2020

(54) CONVERSION DEVICE FOR QUICK CHARGER AND METHOD FOR REALIZING CHARGING CONVERSION

(71) Applicant: Jianhua Xu, Shenzhen (CN)

(72) Inventor: Jianhua Xu, Shenzhen (CN)

(73) Assignee: Shenzhen LVSUN Electronics Technology Co., Ltd, Shenzhen (CN)

( * ) Notice: Subject to any disclaimer, the term of this patent is extended or adjusted under 35 U.S.C. 154(b) by 400 days.

(21) Appl. No.: 15/378,066

(22) Filed: Dec. 14, 2016

(65) Prior Publication Data
US 2018/0166889 A1   Jun. 14, 2018

(51) Int. Cl.
*H02J 7/00* (2006.01)
*H02J 7/14* (2006.01)
*G05F 1/56* (2006.01)

(52) U.S. Cl.
CPC .............. *H02J 7/007* (2013.01); *G05F 1/56* (2013.01); *H02J 7/0029* (2013.01); *H02J 7/0052* (2013.01); *H02J 2007/0039* (2013.01); *H02J 2007/0059* (2013.01)

(58) Field of Classification Search
USPC .............. 320/107, 104, 105, 106, 108, 109
See application file for complete search history.

(56) References Cited

U.S. PATENT DOCUMENTS

| | | | | |
|---|---|---|---|---|
| 5,789,899 A * | 8/1998 | van Phuoc | ........... | H01M 6/5011 320/112 |
| 2004/0095118 A1 * | 5/2004 | Kernahan | ............. | H02J 7/0065 323/282 |
| 2009/0015216 A1 * | 1/2009 | Seberger | ............... | H02M 3/155 323/234 |
| 2009/0096413 A1 * | 4/2009 | Partovi | ................... | H01F 5/003 320/108 |
| 2010/0264731 A1 * | 10/2010 | Arimilli | .................. | H02J 1/102 307/24 |
| 2014/0097791 A1 * | 4/2014 | Lisuwandi | .............. | H01F 38/14 320/108 |
| 2015/0188334 A1 * | 7/2015 | Dao | ....................... | H02J 7/0013 320/107 |
| 2016/0131709 A1 * | 5/2016 | Yoo | .................. | G01R 31/31721 324/762.01 |
| 2016/0134135 A1 * | 5/2016 | Liu | ........................ | H02J 7/008 320/107 |
| 2016/0219664 A1 * | 7/2016 | Ellenberger | ....... | H05B 33/0842 |
| 2017/0336819 A1 * | 11/2017 | Pons | ........................ | G05F 1/56 |

* cited by examiner

*Primary Examiner* — Alexis B Pacheco

(57) ABSTRACT

Disclosed a conversion device for a quick charger, comprising an input end, a voltage regulator module, a recognition module, a control module and an output end, wherein, the voltage regulator module receives a power voltage through the input end to stabilize a voltage, and outputs the power voltage after voltage stabilization to the recognition module and the control module; the control module reads a conversion voltage of the output end, and produces a conversion signal group according to the conversion voltage to output to the recognition module; and the recognition module produces a handshake signal and a voltage recognition signal according to the conversion signal, and outputs through the input end. Through the device and method, equipment that are not quickly charged may also be charged by the quick charger, so that an application scope of the quick charger is expanded.

11 Claims, 4 Drawing Sheets

CONVERSION DEVICE FOR QUICK CHARGER AND METHOD FOR REALIZING CHARGING CONVERSION

TECHNICAL FIELD

The present invention relates to the field of charging technology, and more particularly, to a conversion device for a quick charger, and to a method for realizing charging conversion through the conversion device.

BACKGROUND OF THE INVENTION

Qualcomm QC2.0/3.0 (Quick Charge 2.0/3.0, quick charge technology 2.0/3.0) is a hot topic in the entire current quick charge industry. Previously, quick charge is achieved in a manner of promoting current, while, 5V/2 A (i.e., 10 W of power) borne by a Micro USB has reached a critical point, so that re-increase in current is bound to double a reject ratio of the Micro USB. At this time, a QC2.0 quick charge converter with high voltage is quickly and warmly welcomed by consumers in the context without changing a Micro USB interface.

Now there are a large number of QC2.0/3.0 quick chargers on the market, while there are more devices without QC2.0/3.0 quick charge technology. Both of the two may not be compatible, so that the devices without QC2.0/3.0 quick charge technology fail to be charged by means of the QC2.0/3.0 quick chargers.

At present, there are also a few of quick chargers emerged, but limited by the technology of the current quick charger. The current emerged quick chargers select to output multi-gear quick charging voltage through a key, and a two-position or multi-position switch, that is to say, needing to realize manually. In this way, it is inconvenient very much, its performance is also not high (such as incapable of outputting a higher charging voltage), and the key is likely to be damaged easily.

DESCRIPTION OF THE INVENTION

According to one aspect of the present invention, a conversion device for a quick charger is provided and comprises an input end, a voltage regulator module, a recognition module, a control module and an output end, wherein the input end is connected with the voltage regulator module and the recognition module respectively, the voltage regulator module is connected with the recognition module and the control module respectively, the recognition module is connected with the control module, and the control module is connected with the output end; wherein, the voltage regulator module receives a power voltage through the input end to stabilize a voltage, and outputs the power voltage after voltage stabilization to the recognition module and the control module; the control module reads a conversion voltage of the output end, and produces a conversion signal group according to the conversion voltage to output to the recognition module; and the recognition module produces a handshake signal and a voltage recognition signal according to the conversion signal, and outputs through the input end.

Through the conversion device provided by the present invention, the conversion voltage may be regulated through the output end according to the requirements of the charging voltage, the control module controls according to the conversion voltage, to produce different handshake signals and recognition voltage signals at the input end through the recognition module, to establish handshake with the quick charger through the handshake signal, and to control the mode of the output voltage of the quick charger through the recognition voltage signal, so that the multi-gear quick charge voltage is automatically output according to the requirements, in order to charge the device that is not equipped with the quick charge function by means of the quick charger. In addition, the device of the present invention further stabilizes the voltage through the voltage regulator module, so as to provide a stable power voltage for the recognition module and the control module. Overcurrent protection is provided for the device through a constant voltage to avoid exception caused by current or voltage fluctuation, so that the performance of the conversion device is improved.

In some embodiments, the control module comprises a second control chip, and a storage unit and a control unit configured in the second control chip, the control module is connected with the output end through a third pin of the second control chip, and is connected with the recognition module through a first pin, a fourth pin and a sixth pin of the second control chip, wherein, the storage unit is configured to store reference range data of the conversion voltage, the control unit is configured to read conversion voltage data of the third pin of the second control chip to match with the reference range data of the storage unit, and the conversion signal group is produced according to a matching result and output through the first pin, the fourth pin and the sixth pin of the second control chip. Therefore, the control module controls the handshake signal and the recognition voltage signal produced by the recognition module through outputting different conversion signal groups according to the numerical value of the conversion voltage to communicate with the quick charger, thereby achieving an effect of controlling the charging voltage output by the quick charger according to the requirements of an external charging device to charge the device that is not quickly charged by means of the quick charger.

In some embodiments, the output end comprises a first resistor, a second resistor and a third resistor, wherein the third resistor and the first resistor are connected in series, the first resistor is connected with a power supply anode, and the third resistor is connected with a power supply ground wire, wherein a monitoring point is arranged between the first resistor and the third resistor, one end of the second resistor is connected with the monitoring point, while the other end thereof is connected with the third pin of the second control chip. Through equipping the monitoring point, the power supply anode and a power supply ground wire jack at the output end, a resistance value of the output end at the monitoring point may be dynamically regulated according to different connected charging joints, thereby regulating the resistance value according to the charging voltage as required for the connected charging device, to achieve the purpose of outputting different conversion voltages.

In some embodiments, the recognition module is a resistance bridge circuit, comprising a sixth resistor, a seventh resistor, an eighth resistor and a ninth resistor, wherein the sixth resistor and the eighth resistor are connected in series, the sixth resistor is connected with the voltage regulator module, and the eighth resistor is connected with the fourth pin of the second control chip; the seventh resistor and the ninth resistor are connected in series, the seventh resistor is connected with the first pin of the second control chip, and the ninth resistor is connected with the sixth pin of the second control chip; and a first detection point is arranged between the sixth resistor and the eighth resistor, a second detection point is arranged between the seventh resistor and the ninth resistor, the first detection point is connected to a data line anode of the input end), and the second detection point is connected to a data line cathode of the input end. Thus, the control module may control the resistance bridge circuit through the output conversion signal to regulate the resistance value, thereby outputting different voltage signals at the first detection point and the second detection point to convert the voltage values of the two data lines at the input end between the voltage values of time sequence protocol. In this way, the handshake signal and the recognition voltage signal are produced by the resistance bridge circuit to shake hand and communicate with the quick charger, so as to control the quick charger according to the recognition voltage to produce the charging voltage that meets the requirements according to the time sequence protocol.

In some embodiments, the voltage regulator module is an LDO voltage regulator circuit, the LDO voltage regulator circuit comprises a first capacitor, a second capacitor and a first control chip, wherein one end of the first capacitor is connected with the power supply anode and an input pin of the first control chip respectively, while the other end thereof is connected with the power supply ground wire; and one end of the second capacitor is connected with the reference voltage and an output pin of the first control chip, while the other end thereof is connected with the power supply ground wire. Thus, the stable power voltage may be provided for the recognition module and the control module through the LDO voltage regulator circuit, so as to ensure the performance of a convertor.

In some embodiments, the device further comprises a conversion joint, wherein the conversion joint is divided into a 5V gear converting head, a 9V gear converting head, a 12V gear converting head, a 14.5V gear converting head and a 20V gear converting head, the conversion joint is connected with the output end, and controls a numerical value of the conversion voltage output by the output end. Thus, through equipping with the converting heads of the resistor containing different resistance values, the resistance value of the monitoring point at the output end may be regulated to output different conversion voltages, thereby achieving the purpose of outputting multi-gear charging voltages including 5V, 9V, 12V, 14.5V and 20V. As a result, a recognition process of the output end is simplified, the recognition precision is improved, and a recognition error caused by incompatibility is reduced, so that the scope of the output charging voltage is controlled better, and the universality of the converting device is improved. In addition, through equipping with different types of converting joints, the output charging voltage may reach up to a maximum value of 20V, thereby charging more devices such as notebook computer by means of the quick charger. This is very smart. In this way, the application scope of the quick charger is increased drastically, so that the application value of the quick charge technology is maximized.

According to the other aspect of the present invention, a method for realizing charging conversion through the above quick charging conversion device is further provided, comprising the following steps of:

outputting a corresponding conversion voltage by an output end according to a type of a charging joint connected thereto;

reading voltage data by a control module, and producing a conversion signal group according to the conversion voltage data; and producing a handshake signal and a recognition voltage signal according to the conversion signal group, and outputting the produced handshake signal and recognition voltage signal through an input end.

Through the method of the present invention, the output charging voltage may be controlled to convert by the converting device, so that the quick charger charges the charging device. No matter whether the quick charge protocol is realized by the charging device, the application scope of the quick charger is expanded, the problem of incompatibility between the charging device and the quick charger is solved, and the universality of the quick charger is improved.

In some embodiments, wherein, the control module comprises a second control chip, and a storage unit and a control unit configured in the second control chip, the control module is connected with the output end through a third pin of the second control chip, and is connected with the recognition module through a first pin, a fourth pin and a sixth pin of the second control chip, and the reading the voltage data, and producing the conversion signal group according to the conversion voltage data comprises the following sub-steps of:

reading the conversion voltage data through the second control chip and the third pin; and comparing the read conversion voltage data with reference range data pre-stored in the storage unit through the control unit, and producing the conversion signal group according to a compared result to output through the first pin, the fourth pin and the sixth pin of the second control chip.

In some embodiments, the conversion signal group comprises a dynamically changed voltage signal and a stable voltage signal, and the producing the handshake signal and the recognition voltage signal according to the conversion signal group to output comprises the following sub-steps of:

generating the handshake signal according to the dynamically changed voltage signal in the conversion signal group to load at a data line anode end and a data line cathode end of the input end; and generating the recognition voltage signal according to the stable voltage signal in the conversion signal group to load at the data line anode end and the data line cathode end of the input end.

In some embodiments, wherein the connected charging joint comprises a 5V gear converting head, a 9V gear converting head, a 12V gear converting head, a 14.5V gear converting head and a 20V gear converting head, the outputting the corresponding conversion voltage according to the type of the connected charging joint comprises the following sub-steps of:

when the output end is connected with the 5V gear converting head, offering a 4.32K resistance value to the power supply anode, so as to output a 3.387V-3.810V conversion voltage to the third pin of the second control chip; and when the output end is connected with the 9V gear converting head, offering a 24K resistance value to the power supply anode, so as to output a 1.6V-1.8V conversion voltage to the third pin of the second control chip; and when the output end is connected with the 14.5V gear converting head, offering a 240K resistance value to the power supply anode, so as to output a 0.533V-0.6V conversion voltage to the third pin of the second control chip; and when the output end is connected with the 20V gear converting head, offering a 7.87K resistance value to a power supply ground wire, so as to output a 0.169V-0.192V conversion voltage to the third pin of the second control chip.

Through the device and the method of the present invention, the multi-gear charging voltage may be output, the charging voltage may reach up to a maximum of 20V, thereby being capable of charging the notebook computer on site by means of the quick charger. In this way, the application scope is very extensive.

DETAILED DESCRIPTION OF THE INVENTION

The embodiments of the invention is described in details with reference to the drawings hereinafter.

Figure 1:
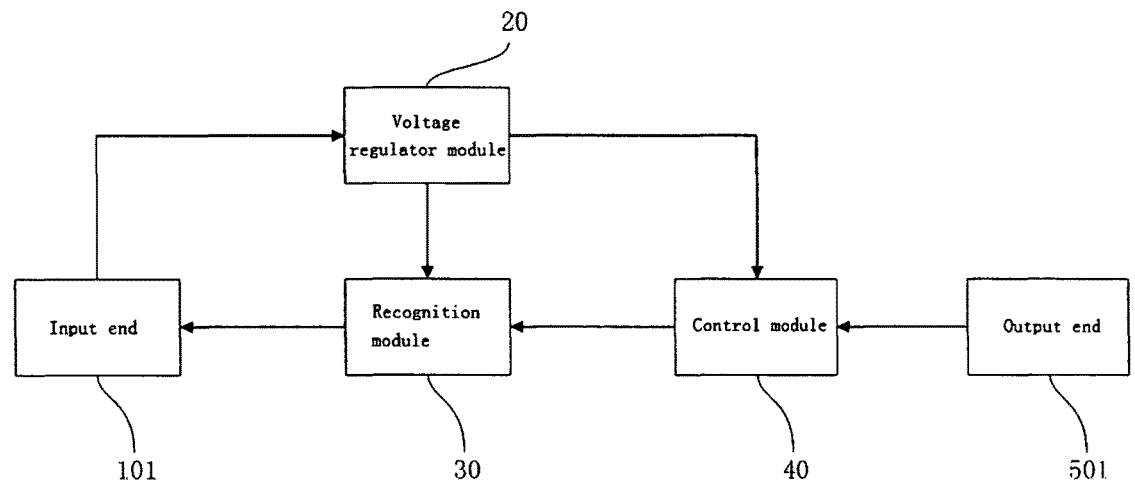
FIG. 1 is a modular structure schematic diagram of a quick charge conversion device according to one embodiment of the present invention.

FIG. 1 schematically illustrates a module structure of a quick charge conversion device according to one embodiment of the present invention.

As illustrated in FIG. 1, the conversion device comprises an input end 101, a voltage regulator module 20, a recognition module 30, a control module 40 and an output end 501. Wherein, one end of the voltage regulator module 20 is connected with the input end 101 to obtain an input voltage, while the other end thereof is connected with the recognition module 30 and the control module 40 respectively, the voltage regulator module 20 stabilizes the input voltage obtained from the input end 101 and then outputs to the recognition module 30 and the control module 40, thereby providing a stable power voltage for the recognition module 30 and the control module 40. The control module 40 is connected with the output end 501 and the recognition module 30, detects the conversion voltage output by the output end 501 to judge, and produces a conversion signal group according to a judging result to output to the recognition module 30. The recognition module 30 is connected with the input end 101, produces a handshake signal and a recognition voltage signal according to the received conversion signal, and outputs the handshake signal and the recognition voltage signal through the input end 101. When using the conversion device of the embodiment of the present invention, the input end 101 is connected with a quick charger, and the output end 501 is connected with a charging device or a converting head, so that the charging device that is not quickly charged is charged by the quick charger.

Figure 2:
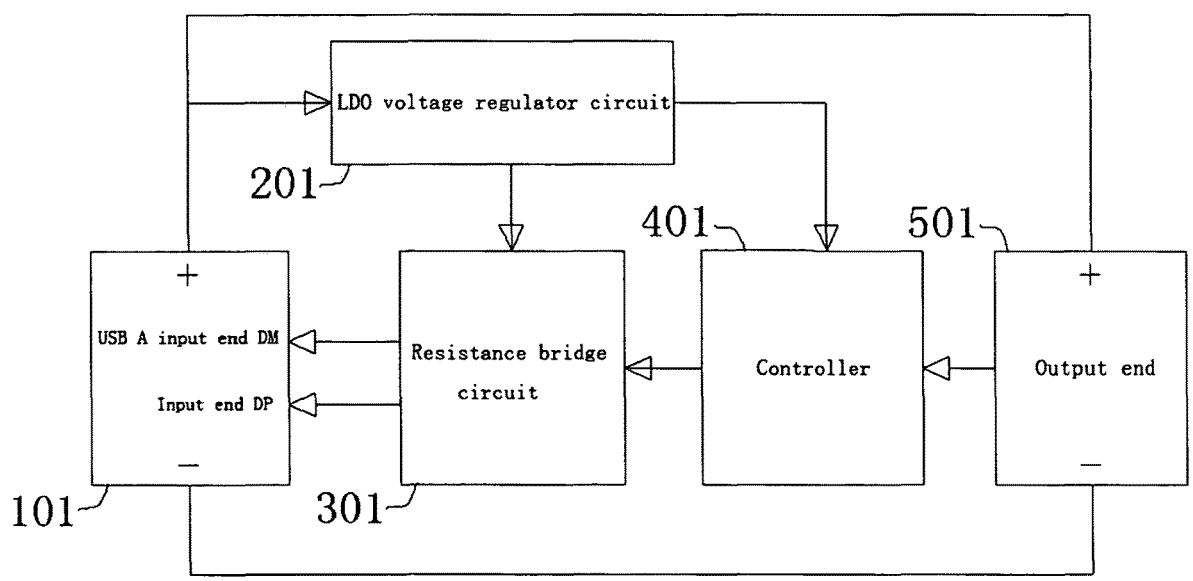
FIG. 2 is a circuit realization schematic diagram of a modular structure of the quick charge conversion device as illustrated in FIG. 1.

In a specific embodiment, the voltage regulator module 20 may be any circuit or device that is used for voltage stabilization to provide a stabilized voltage supply. In the embodiment of the present invention, an LDO voltage regulator circuit is optimized. The control module 40 may be any device or circuit that may read the conversion voltage to produce the conversion signal group. In the embodiment of the present invention, a programmable control IC with a storage function is optimized. The recognition module 30 may be any device or circuit that may receives the conversion signal group of the control module 40 to judge, thereby producing the handshake signal and the recognition voltage signal to output. In the embodiment of the present invention, a resistance bridge circuit is optimized. While the output end 501 needs to have an adjustable voltage circuit, so as to output the conversion voltage with different amplitudes according to different requirements for the connected external devices (such as a charging device or a converting head). In FIG. 2, by taking the input end as a USB A male input end, the voltage regulator module 20 as the LDO voltage regulator circuit, the control module 40 as a controller, the recognition module 30 as a resistance bridge circuit, and the output end 501 containing a variable resistance monitoring point circuit for example, the implementation principle of the conversion device as illustrated in FIG. 1 is shown. The conversion device is described in details with reference to FIG. 2.

As illustrated in FIG. 2, the LDO voltage regulator circuit 201 is connected with a power supply anode of the input end to stabilize the voltage output by the power supply anode, thereby providing a constant power voltage for the resistance bridge circuit 301 and the controller 401. The controller 401 reads the conversion voltage from the output end 501, and judges a numerable value of the read conversion signal to produce the conversion signal group according to a judging result to output to the resistance bridge circuit 301. The resistance bridge circuit 301 receives the conversion signal group output by the controller 401, and produces the handshake signal and the recognition voltage signal according to the conversion signal group. The produced handshake signal and recognition voltage signal are loaded at both ends of two differential signals D+(i.e., DP) and D− (i.e., DM) at the input end 101, so that the handshake signal and the recognition voltage signal may be output to the quick charger through the D+ and D− at the input end. After receiving the signal, the quick charger may shake hand with the conversion device according to the handshake signal, and regulates a PWM signal through the recognition voltage signal, so as to stabilize the output voltage (i.e., charging voltage) within corresponding amplitude.

Wherein, in specific implementation, the conversion signal group, the handshake group and the recognition voltage signal are produced according to a time sequence protocol and a quick charge protocol of the connected quick charger. For example, according to the quick protocol of the QC2.0/3.0, the output charging voltage scope is between 5V and 20V, and the time sequence protocol is as follows:

When both D+ and D− are 0.6V and remain for about 1.5 s, and then D− is changed as 0V and remains for 50 ms, the handshake is established. After establishing the handshake, both D+ and D− remain at the following voltage value, the charging voltage output by the QC2.0/3.0 quick charger is as follows according to the output of the stabilized voltage of D+ and D−:

| D+ | D− | HVDCPoutput (output high charging voltage) |
|---|---|---|
| 0.6 V | 0.6 V | 12 V |
| 3.3 V | 0.6 V | 9 V |
| 0.6 V | 0 V | continuous mode |
| 3.3 V | 3.3 V | 20 V |

Under the circumstances, in the specific application, the controller produces the conversion signal group to output to the resistance bridge circuit according to the conversion voltage and the above time sequence protocol. It may be known according to the above time sequence protocol that the content of the conversion signal group inevitably comprises two portions, one portion of which is used for establishing the handshake, while the other portion of which is used for controlling the output charging voltage, wherein the conversion signal group for establishing the handshake is a dynamically changed signal, while the conversion signal group for controlling the output charging voltage is a stable signal. After receiving the conversion signal group, the resistance bridge circuit produces the handshake signal according to a dynamically changed portion in the conversion signal group, and produces the recognition voltage signal according to a stable portion. While the handshake signal is as follows according to the above time sequence protocol: both D+ and D− are 0.6V and remain for about 1.5 s, and then the output voltage of D− is changed as 0V and remains for 50 ms. After loading the generated handshake signal at the data line anode DP (i.e., D+) and the data line cathode (i.e., D−) of the input end, the resistance bridge circuit may establish the handshake with the quick charger. While, after establishing the handshake through the handshake protocol (i.e., both D+ and D− are 0.6V and remain for about 1.5 s, and then the output voltage of D− is changed as 0V and remains for 50 ms), the resistance bridge circuit 301 loads the recognition voltage signal to the data line anode DP and the data line cathode DM of the input end, so as to control the charging voltage output by the quick charger. According to the time sequence protocol, the control is specifically as follows: when two differential signals D+ and D− are fixed at 0.6V by the resistance bridge circuit 301, according to a QC3.0 quick protocol, the QC3.0 quick charger stabilizes the output voltage at 12V; but when both D+ and D− are fixed at 3.3V and 0.6V by the resistance bridge circuit 301 respectively, according to the QC3.0 quick protocol, the QC3.0 quick charger stabilizes the output voltage at 9V; and when two differential signals D+ and D− are fixed at 3.3V by the resistance bridge circuit 301, according to a QC3.0 quick protocol, the QC3.0 quick charger stabilizes the output voltage at 20V. Thus, the quick charger merely needs to recognize the handshake signal loaded on the data line anode DP and the data line cathode DM of the input end according to the time sequence protocol thereof, and judges a stable level signal value loaded on the data line anode DP and the data line cathode DM after establishing the handshake, thereby outputting the charging voltage with the corresponding amplitude according to the protocol thereof. The handshake signal and the recognition voltage signal loaded on D+ (i.e., DP) and D− (i.e., DM) are completely controlled by the generated conversion signal through the controller, in fact, that is to shake hand and communicate with the quick charger through regulating the voltage of the resistance bridge circuit by the controller while the actual charging device does not need to interact with the quick charger, thereby charging the device that is not provided with the quick charge function through the quick charger and realizing the compatibility between a product and the power supply. Wherein, the quick charge protocol is provided by different quick charge technology suppliers. The device of the present invention merely needs to comply with a mature quick charge protocol to shake hand and communicate with the quick charger, so as to control the quick charger to output the corresponding charging voltage. Therefore, no matter how the quick charge technology and the quick charge protocol are changed, a technical solution of regulating the conversion voltage according to the external requirements and reading the conversion voltage through the control module to produce the conversion signal group, and regulating the conversion signal group as the handshake signal and the recognition voltage signal through the recognition module to output to the quick charger, so as to control the quick charger to output is part of a transformed example based on the conception of the present invention, and shall be deemed to be fallen within the protection scope of the present invention.

FIG. 3 to FIG. 6 give the more specific implementation mode of various modules of one preferable embodiment, which will be further described in details with reference to the drawings hereinafter.

Figure 3:
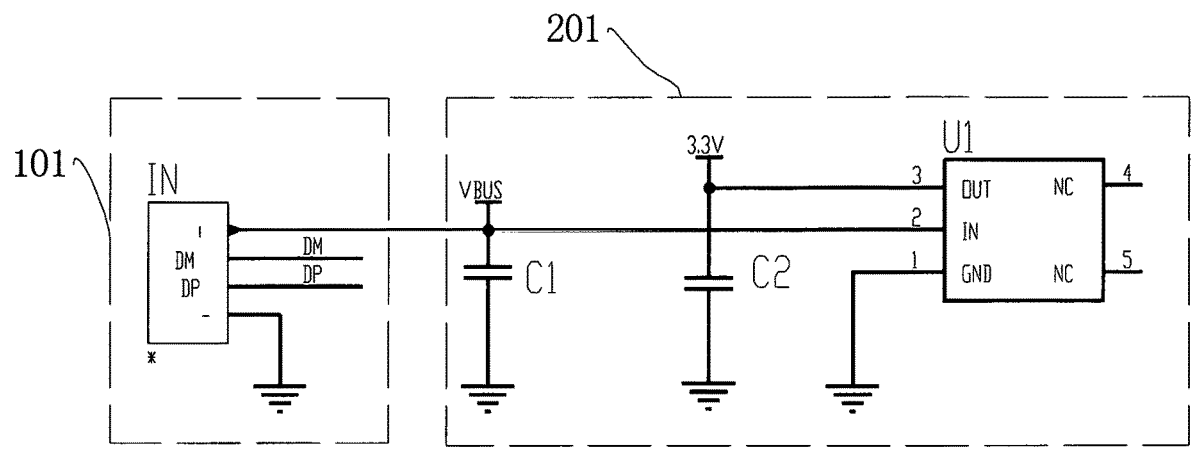
FIG. 3 is a schematic circuit diagram of an input end and a voltage regulator circuit in the embodiment as illustrated in FIG. 2.

FIG. 3 schematically shows the schematic circuit diagram of the LDO voltage regulator circuit. As illustrated in FIG. 3, the LDO voltage regulator circuit 201 comprises a first capacitor C1, a second capacitor C2 and a first control chip U1. Wherein, one end of the first capacitor C1 is connected with the power supply anode of the input end 101 and the input pin of the first control chip U1 respectively, while the other end thereof is connected with the power supply ground wire; and one end of the second capacitor C2 is connected with a reference voltage and an output pin of the first control chip U1 respectively, while the other end thereof is connected with the power supply ground wire. The first control chip U1 stabilizes the voltage of the power supply anode of the input end 101, outputs the power supply voltage consistent with the reference voltage through the output pin, thereby stabilizing the input voltage of the input end. In this way, the provided power voltage is ensured to remain at a voltage value of the reference voltage, for example, as illustrated in the figure, the circuit of this embodiment stably outputs the power voltage of 3.3V.

Figure 4:
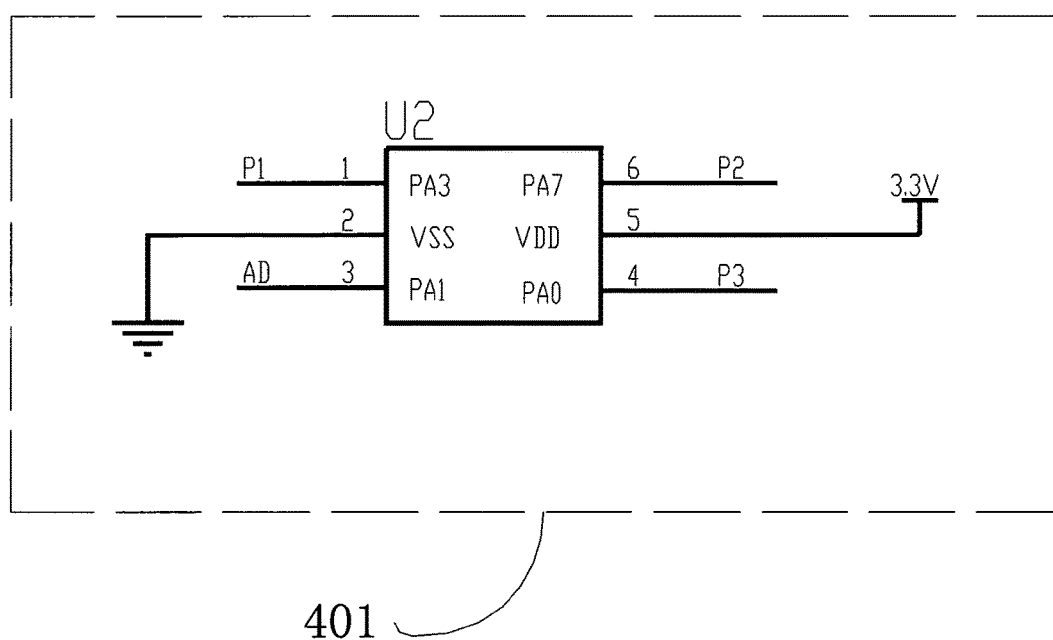
FIG. 4 is a schematic circuit diagram of a control module in the embodiment as illustrated in FIG. 2.

FIG. 4 schematically shows the schematic circuit diagram of the control module. As illustrated in FIG. 4, the controller 401 comprises a second control chip U2, and a storage unit and a control unit configured in the second control chip U2. Wherein, the storage unit is configured to store reference range data of the conversion voltage, the control unit is configured to read conversion voltage data of the third pin of the second control chip U2 to match with the reference range data of the storage unit, and the conversion signal group is produced according to a matching result and output through the first pin, the fourth pin and the sixth pin of the second control chip U2. Wherein, the second control chip U2 is optimized as a TM57PA16-QC3D control chip. The reference scope data of the conversion voltage stored by the storage unit is set according to the charging voltage value as required for outputting, for example, for the QC3.0 quick charger capable of outputting the voltage scope of 5V-20V, the reference scope of the conversion voltage corresponding to the output voltage at 5V gear, 9V gear, 14.5V gear and 20V gear and respectively stored in the storage unit is as follows:

for 5V gear, the reference scope of the conversion voltage corresponding to the gear and stored in the storage unit is 3.387V-3.810V;

for 9V gear, the reference scope of the conversion voltage corresponding to the gear and stored in the storage unit is 1.6V-1.8V;

for 14.5V gear, the reference scope of the conversion voltage corresponding to the gear and stored in the storage unit is 0.533V-0.6V; and for 20V gear, the reference scope of the conversion voltage corresponding to the gear and stored in the storage unit is 0.169V-0.192V.

In this embodiment, the third pin (i.e., AD port) of the second control chip U2 is connected to the output end 501, and the first pin, the fourth pin and the sixth pin of the second control chip U1 are connected to the resistance bridge circuit 301. Thus, the second control chip U2 may read the conversion voltage from the output end 501 through the third pin (i.e., AD port). Then, the control unit compares the conversion voltage with the reference scope in the storage unit, and produces the corresponding conversion signal according to the reference scope where the conversion voltage is located and outputs to the resistance bridge circuit through the first pin, the fourth pin and the sixth pin. For example, when the conversion voltage read from the output end is within the reference scope of 5V gear (such as, 3.387V), the control unit produces the conversion signal group corresponding to the 5V gear, and outputs to the resistance bridge circuit through the first pin, the fourth pin and the sixth pin of the second control chip U2. The resistance bridge circuit may produce the handshake signal and the recognition voltage signal according to the conversion signal group corresponding to the 5V gear, so as to shake hand and communicate with the quick charger, thereby enabling the quick charger to stably outputting the charging voltage of 5V.

Wherein, the content of the conversion signal group produced by the control unit is produced according to the quick charge time sequence protocol. For example, for the time sequence protocol of the QC2.0/3.0 quick charger (referring to the detailed description of the QC2.0/3.0 time sequence protocol), the content of the produced conversion signal group is as follows:

(1) When the conversion voltage is within the reference scope of 5V gear, the produced conversion signal group is that: the first pin of the second control chip outputs a voltage of 3.3V, the fourth pin outputs a voltage of 0V, and the sixth pin outputs a voltage of 0V, and the three remain for 1.5 s under the state; then, the first pin outputs a voltage of 0V, and the sixth pin outputs a voltage of 0V, and the two remain for about 50 ms under the state; at last, the voltages output by the three pins are stabilized as the voltage of 0V output by the first pin, the voltage of 0V output by the fourth pin, and the voltage of 0V output by the sixth pin;

(2) When the conversion voltage is within the reference scope of 9V gear, the produced conversion signal group is that: the first pin of the second control chip outputs a voltage of 3.3V, the fourth pin outputs a voltage of 0V, and the sixth pin outputs a voltage of 0V, and the three remain for 1.5 s under the state; then, the first pin outputs a voltage of 0V, and the sixth pin outputs a voltage of 0V, and the two remain for about 50 ms under the state; at last, the voltages output by the three pins are stabilized as the voltage of 3.3V output by the first pin, the voltage of 3.3V output by the fourth pin, and the voltage of 0V output by the sixth pin;

(3) When the conversion voltage is within the reference scope of 12V gear, the produced conversion signal group is that: the first pin of the second control chip outputs a voltage of 3.3V, the fourth pin outputs a voltage of 0V, and the sixth pin outputs a voltage of 0V, and the three remain for 1.5 s under the state; then, the first pin outputs a voltage of 0V, and the sixth pin outputs a voltage of 0V, and the two remain for about 50 ms under the state; at last, the voltages output by the three pins are stabilized as the voltage of 3.3V output by the first pin, the voltage of 0V output by the fourth pin, and the voltage of 0V output by the sixth pin;

(4) When the conversion voltage is within the reference scope of 14.5V gear, the produced conversion signal group is that: the first pin of the second control chip outputs a voltage of 3.3V, the fourth pin outputs a voltage of 0V, and the sixth pin outputs a voltage of 0V, and the three remain for 1.5 s under the state; then, the first pin outputs a voltage of 0V, and the sixth pin outputs a voltage of 0V, and the two remain for about 50 ms under the state; at last, the voltages output by the three pins are stabilized as the voltage of 3.3V output by the first pin, the voltage of 0V output by the fourth pin, and the voltage of 3.3V output by the sixth pin; and (5) When the conversion voltage is within the reference scope of 20V gear, the produced conversion signal group is that: the first pin of the second control chip outputs a voltage of 3.3V, the fourth pin outputs a voltage of 0V, and the sixth pin outputs a voltage of 0V, and the three remain for 1.5 s under the state; then, the first pin outputs a voltage of 0V, and the sixth pin outputs a voltage of 0V, and the two remain for about 50 ms under the state; at last, the voltages output by the three pins are stabilized as the voltage of 3.3V output by the first pin, the voltage of 3.3V output by the fourth pin, and the voltage of 3.3V output by the sixth pin.

Figure 5:
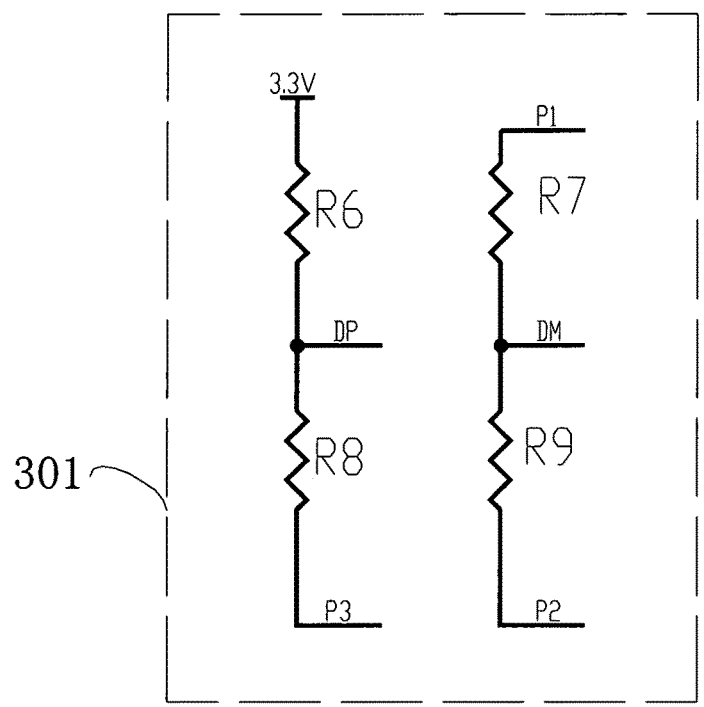
FIG. 5 is a schematic circuit diagram of a resistance bridge circuit in the embodiment as illustrated in FIG. 2.

FIG. 5 schematically shows the schematic circuit diagram of the resistance bridge circuit. As illustrated in FIG. 5, the resistance bridge circuit 301 comprises a sixth resistor R6, a seventh resistor R7, an eighth resistor R8 and a ninth resistance R9. Wherein, the sixth resistor R6 and the eighth resistor R8 are connected in series, and the seventh resistor R7 and the ninth resistance R9 are connected in series. In addition, the sixth resistor R6 is connected with the output pin of the first control chip of the LDO voltage regulator circuit 201, so as to obtain a stable power voltage. The seventh resistor R7, the eighth resistor R8 and the ninth resistance R9 are connected with the first pin, the fourth pin and the sixth pin of the second control chip U2 respectively, so as to obtain the conversion signal group. A first detection point is arranged between the sixth resistor R6 and the eighth resistor R8, a second detection point is arranged between the seventh resistor R7 and the ninth resistor R9, the first detection point is connected to a data line anode DP of the input end 101, and the second detection point is connected to a data line cathode DM of the input end 101. The control unit of the second control chip U2 controls to produce the conversion signal group corresponding to the relevant gear according to the conversion signal of the output end 501. The resistance bridge circuit 301 receives the conversion signal group through the first pin, the fourth pin and the sixth pin, and then produces the handshake signal and the recognition voltage signal respectively, and loads the handshake signal and the recognition voltage signal at the data line anode DP and the data line cathode DM. The signal is transmitted to a control chip of the quick charger through the input end, so that the second control chip U2 of the converter shakes hand and communicates with the control chip of the quick charger. Moreover, the quick charger is controlled to output the regulated voltage (such as 5V or 9V or 14.5V or 20V) according to the stable level loaded on the data line anode DP and the data line cathode DM, so that the quick charger is used for charging the device that is not quickly charged. Wherein, according to the above description, it can be known that the producing the handshake signal by the resistance bridge circuit 301 according to the conversion signal is producing the handshake according to the portion of the voltage value changed in the conversion signal group, while the producing the recognition voltage signal is producing the recognition voltage signal according to the voltage value stabilized in the conversion signal group. For example, according to the content of the conversion signal group produced corresponding to the time sequence protocol of the QC2.0/3.0 quick charger, for the content of the 9V gear conversion signal group, the resistance bridge circuit 301 firstly produces the handshake signal according to the content of the conversion signal group of "the first pin outputs the voltage of 3.3V, the fourth pin outputs the voltage of 0V, and the sixth pin outputs the voltage of 0V, and the three remain for 1.5 s under the state; then, the first pin outputs the voltage of 0V, and the sixth pin outputs the voltage of 0V, and the two remain for about 50 ms under the state"; and then the recognition voltage signal is produced according to the content of the conversion signal group of "the voltages output by the three pins are stabilized as the voltage of 3.3V output by the first pin, the voltage of 3.3V output by the fourth pin, and the voltage of 0V output by the sixth pin". Wherein, according to the content of the conversion signal group, referring to the resistance bridge circuit in FIG. 5, the produced handshake signal is to produce a voltage of 0.6V at the position of the first detection point and remain for about 1.5 s, and to produce a voltage of 0.6V at the position of the second detection point and remains for about 1.5 s at the same time, and then to produce voltage of 0V at the position of the second detection point and remains for about 50 ms. Thus, the produced handshake signal is output at the data line anode DP and the data line cathode DM of the input end, and the quick charger may detect the handshake signal and establish the handshake with the conversion device through the handshake signal. Then, the resistance bridge circuit produces the recognition voltage signal to produce a stable voltage of 3.3V at the position of the first detection point and a stable voltage of 0.6V at the point of the second detection point according to the content of the conversion signal group. Thus, the produced recognition voltage signal is output at the data line anode DP and the data line cathode DM of the input end, and the quick charger enters into a 9V mode according to the detected recognition voltage signal, and stably outputs the charging voltage of 9V. Thus, the control module may control the change in the level of the first detection point and the second detection point of the resistance bridge circuit through the produced conversion signal, so that the voltage signals output through the data line anode DP and the data line cathode DM of the input end are switched according to the time sequence protocol of the quick charger, to control the quick charger to output the charging voltage that meets the requirements.

Figure 6:
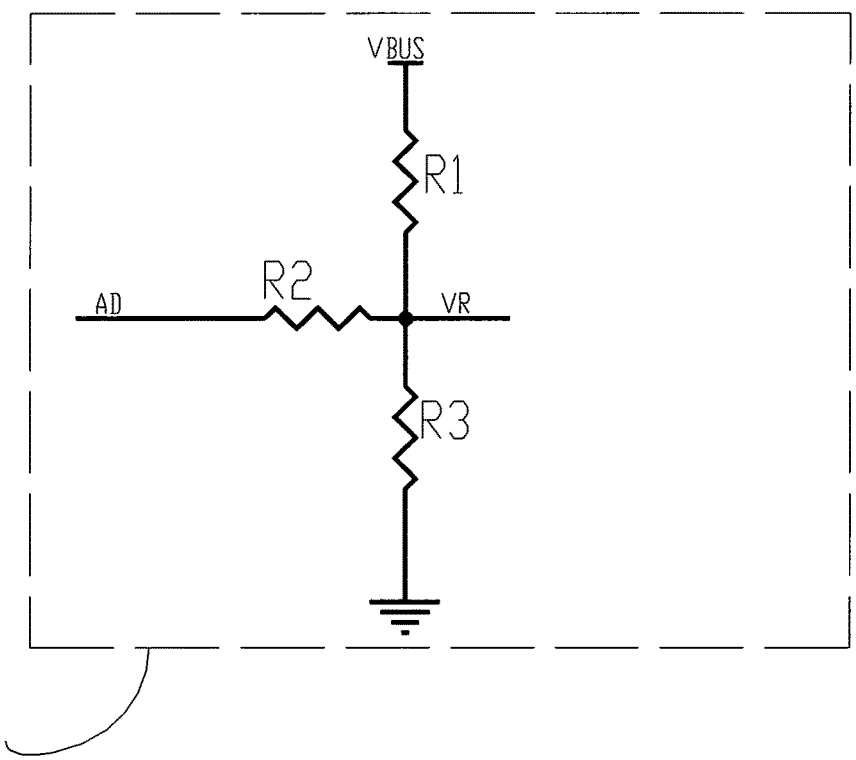
FIG. 6 is a schematic circuit diagram of an output end in the embodiment as illustrated in FIG. 2.

FIG. 6 schematically shows the schematic circuit diagram of the output end. As illustrated in FIG. 6, the output end 501 comprises a first resistor R1, a second resistor R2 and a third resistor R3, wherein the third resistor R3 and the first resistor R1 are connected in series, the first resistor R1 is connected with the power supply anode, the third resistor R3 is connected with the power supply ground wire, wherein, a monitoring point VR is arranged between the first resistor R1 and the third resistor R3, and the monitoring point is connected to the third pin (i.e., AD port) of the second control chip U2 through the second resistor R2. In the specific use, the output end 501 is connected with the charging head of the charging device or connected with a matched converting head, so that the resistance value scope of the resistor at the output end may be regulated according to the voltage requirement of the charging head or the converting head to produce different resistance values at the monitoring point VR, and then the purpose of outputting different conversion voltages to the third pin of the second control chip U2 is achieved. Wherein, the way of regulating the resistance value of the output end 501 may be to provide the converting heads with different voltage amplitudes, such as 5V gear converting head, 9V gear converting head, 12V gear converting head, 14.5V gear converting head and 20V gear converting head, and to provide the resistor with the corresponding resistance value in the converting head. When using, the converting head is inserted into a wiring hole of the monitoring point VR, a VBUS wiring hole and a ground wire hole at the output end 501, so that the resistor in the converting head is connected with the first resistor R1 in series at a VBUS end and a VR end or is connected with the third resistor R3 in parallel at the VR end and the power supply ground wire end, thus regulating the resistance value of the monitoring point VR to achieve the purpose of regulating the conversion voltage of the AD port. Wherein, the implementation solution of regulating the resistor at the output end through providing the resistors with different resistance values in the converting head or the charging head, for example may be specifically as follows: when the output end is connected with the 5V charging head or converting head, the power supply anode VBUS is connected with a resistance value of 4.32K at the monitoring point VR, so that the conversion voltage output to the third pin of the second control chip U2 is within the reference scope of 3.387V-3.810V; when the output end is connected with the 9V charging head or converting head, the power supply anode VBUS is connected with a resistance value of 24K at the monitoring point VR, so that the conversion voltage output to the third pin of the second control chip U2 is within the reference scope of 1.6V-1.8V; when the output end is connected with the 14.5V charging head or converting head, the power supply anode VBUS is connected with a resistance value of 240K at the monitoring point VR, so that the conversion voltage output to the third pin of the second control chip U2 is within the reference scope of 0.533V-0.6V; or when the output end is connected with the 20V charging head or converting head, the power supply anode VBUS is connected with a resistance value of 7.87K at the monitoring point VR, so that the conversion voltage output to the third pin of the second control chip U2 is within the reference scope of 0.169V-0.192V. Thus, the control unit in the second control chip U2 may produce the corresponding conversion signal group according to the read conversion signal, so that the resistance bridge circuit 301 is controlled to output different levels, to enable the quick charger to output the voltage matched with the charging head or the converting head.

Through the conversion device provided by the embodiment of the present invention, various devices including a smart phone and the like may be charged by the quick charge technology, and a high voltage of 20V may also be completely reached, so as to charge the notebook computer and the like. In addition, through matching with different converting heads, the device that is not quickly charged may be either charged or quickly charged, so that it is very flexible and convenient to regulate the charging voltage.

In the specific application corresponding to the QC2.0/3.0 quick charge technology, in order to ensure the output end 501 and the resistance bridge circuit 301 may output the corresponding voltage, the first resistance R1 in the output end 501 is preferably set as 100K, the second resistor R2 is preferably set as 1.5K, and the third resistor R3 is preferably set as 10K, while the resistance value in the converting head may be set according to the type of the converting head, so as to achieve the purpose of regulating the resistance value described above. In the specific application, these resistance values may also be set as the other values, and may be realized by connecting the other resistors in parallel, such as connecting the fourth resistor, the fifth resistor and the like with the third resistor in parallel. Achieving the purpose of regulating the voltage value of the conversion voltage according to the needs may be deemed to fall within the scope disclosed by the present invention. While for the resistance bridge circuit, the sixth resistor R6 in the resistance bridge circuit 301 may be set as 10K, both the seventh resistor R7 and the eighth resistor R8 may be set as 470 Ohm, so as to ensure the conversion signal group output according to the first pin, the fourth pin and the sixth pin of the second control chip outputs the voltage of 0V, 0.6V or 3.3V at the first detection point and the second detection point, thereby shaking hand and communicating with the quick charger based on the quick charge protocol. Wherein, the resistance values of various resistors in the resistance bridge circuit may also be other values as long as the voltage of the first detection point and the second detection point output according to the conversion signal group is ensured among 0V, 0.6V and 3.3V.

Figure 7:
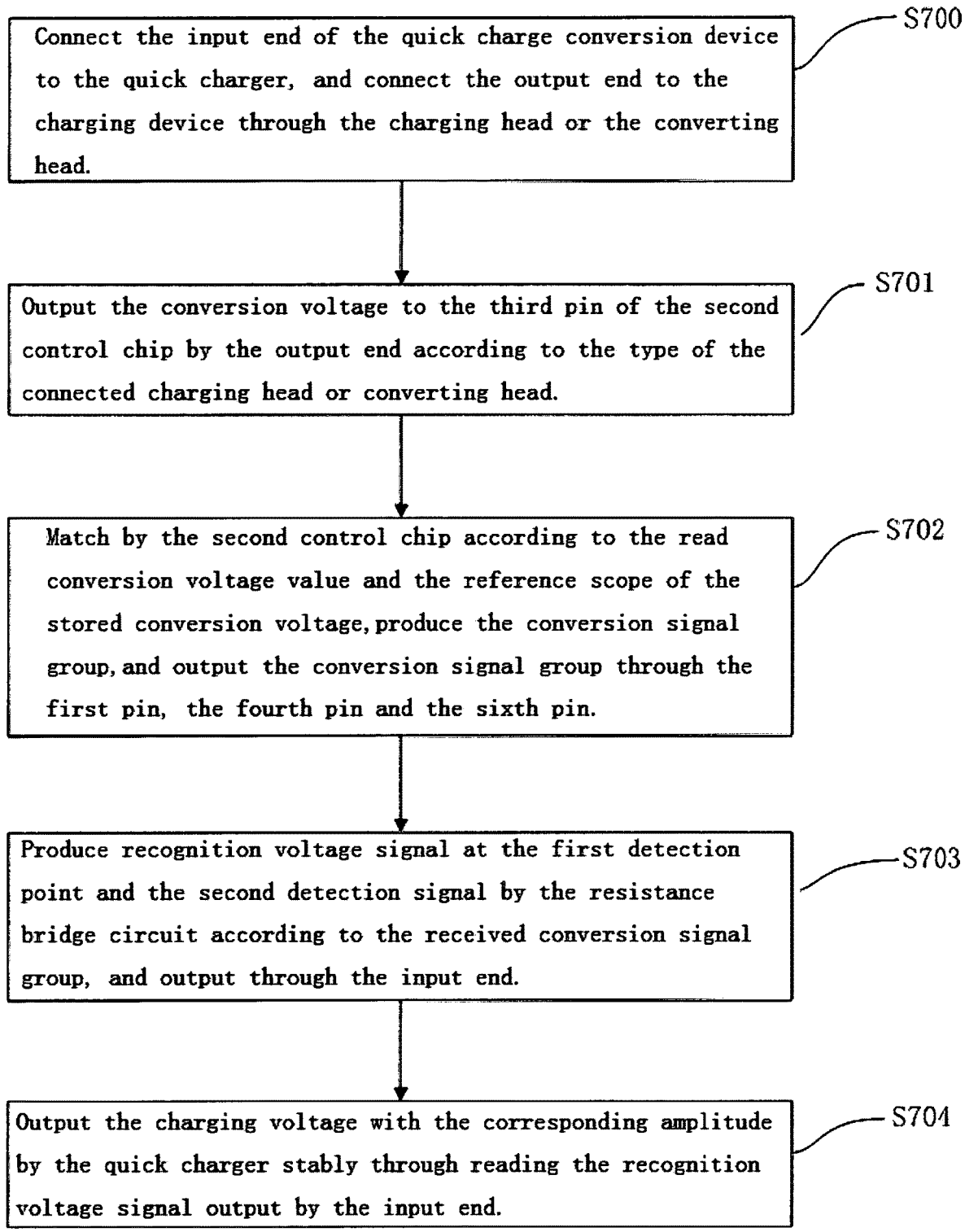
FIG. 7 schematically illustrates a flow chart of a method for realizing charging conversion through the quick charge conversion device as illustrated in FIG. 2.

FIG. 7 schematically illustrates a flow chart of a method for implementing charging conversion through the quick charge conversion device as illustrated in FIG. 2. As illustrated in FIG. 7, the method comprises the following steps.

Step S700: the input end of the quick charge conversion device is connected to the quick charger, and the output end is connected to the charging device through the charging head or the converting head.

When starting charging, the charging device is firstly connected to the quick charger through the quick charge conversion device of the embodiment of the present invention. To be specific, the input end of the quick charge conversion device is connected to the quick charger, and the output end is connected to the charging device. Wherein, the output end being connected to the charging device may be either that the output end being directly connected to the charging device through the charging head of the charging device, or that the output end being connected to the charging device through the matched converting head. Wherein, according to different voltage values as required by the charging device, the converting head may comprise the 5V-gear converting head, the 9V gear converting head, the 12V gear converting head, the 14.5V gear converting head and the 20V gear converting head, so as to connect through the corresponding converting head according to the requirements of the charging device respectively. For example, when the quick charger is used for charging a common mobile phone, the mobile phone is directly connected with the output end to realize 5V charge, while if the quick charger is used for charging the notebook computer, the notebook computer is connected with the output end through the 20V gear converting head.

Step S701: the output end outputs the conversion voltage to the third pin of the second control chip according to the type of the connected charging head or converting head.

The quick charge conversion device recognizes the type of the charging head or converting head, and regulates the resistance value according to the type of the charging head or converting head (such as 5V gear, 20V gear and the like), so that the changed resistance value is produced at the monitoring point VR, and then the different conversion voltage values are produced at the AD, and the conversion voltage is output to the third pin of the second control chip U2. For example, when the output end is connected with the 5V charging head or converting head, the power supply anode VBUS is connected with the resistance value of 4.32K at the monitoring point VR, so that the conversion voltage output to the third pin of the second control chip U2 is within the reference scope of 3.387V-3.810V; when the output end is connected with the 9V charging head or converting head, the power supply anode VBUS is connected with the resistance value of 24K at the monitoring point VR, so that the conversion voltage output to the third pin of the second control chip U2 is within the reference scope of 1.6V-1.8V; when the output end is connected with the 14.5V charging head or converting head, the power supply anode VBUS is connected with a resistance value of 240K at the monitoring point VR, so that the conversion voltage output to the third pin of the second control chip U2 is within the reference scope of 0.533V-0.6V; or when the output end is connected with the 20V charging head or converting head, the power supply anode VBUS is connected with the resistance value of 7.87K at the monitoring point VR, so that the conversion voltage output to the third pin of the second control chip U2 is within the reference scope of 0.169V-0.192V.

Step S702: the second control chip matches according to the read conversion voltage value and the reference scope of the stored conversion voltage, produces the conversion signal group, and outputs the conversion signal group through the first pin, the fourth pin and the sixth pin.

The control unit of the second control chip reads the data of the third pin, and obtains the reference scope from the storage unit to judge, and according to the judging result, produces the corresponding conversion signal group, and outputs the conversion signal group through the first pin, the fourth pin and the sixth pin. Wherein, the produced conversion signal group may be described with reference to the above, which is not elaborated any more herein.

Step 703: the resistance bridge circuit produces the recognition voltage signal at the first detection point and the second detection signal according to the received conversion signal group, and outputs through the input end.

The resistance bridge circuit receives the corresponding conversion signals (i.e., voltage output) through the first pin, the fourth pin and the sixth pin of the second control chip, so that different voltage values (including the handshake signal and recognition voltage signal) are formed at the first detection point and the second detection point. In this way, the voltage of D+ and D− of the input end is switched among 0.6V, 3.3V and 0V according to the time sequence protocol, so as to shake hand and communicate with the quick charger to output the handshake signal and the recognition voltage signal to the quick charger. Wherein, the produced handshake signal and recognition voltage signal may be correspondingly realized according to the quick charge protocol, which may refer to the above description specifically, and will not be elaborated any more herein.

Step S704: the quick charger stably outputs the charging voltage with the corresponding amplitude through reading the recognition voltage signal output by the input end.

The quick charger reads the handshake signal at the data line anode and the data line cathode of the input end to establish the handshake with the conversion device, reads the recognition voltage signal at the input end after handshake, and outputs the corresponding charging voltage according to the time sequence protocol. Therefore, the quick charger is controlled by the conversion device of the present invention through step S700 to step S704, so that the quick charger is used for charging various devices, especially the devices that do not achieve the quick charge technology. This expands the application scope of the quick charger, and improves the expandability of the quick charger. In addition, through the conversion device of the present invention, the charging voltage output by the quick charger reaches up to a maximum of 20V, so that the quick charger is applied in the notebook computer and other devices in ways that the application scope of the quick charger is expanded.

The above only describes some exemplary embodiments of the present invention. Those having ordinary skills in the art may also make many modifications and improvements without departing from the conception of the invention, which shall all fall within the protection scope of the invention.

I claim:

1. A conversion device for a quick charger, comprising: an input end, a voltage regulator module, a recognition module, a control module, and an output end,
   wherein the input end is connected with the voltage regulator module and the recognition module respectively; the voltage regulator module is connected with the recognition module and the control module respectively; the control module is connected with the output end;
   wherein the voltage regulator module receives a power voltage through the input end to stabilize a voltage, and outputs the power voltage after voltage stabilization to the recognition module and the control module; the control module reads a conversion voltage of the output end, and produces a conversion signal group according to the conversion voltage to output to the recognition module; and the recognition module produces a handshake signal and a voltage recognition signal according to the conversion signal, and outputs through the input end;
   wherein the control module comprises a second control chip, and a storage unit and a control unit configured in the second control chip; the control module is connected with the output end through a third pin of the second control chip, and is connected with the recognition module through a first pin, a fourth pin and a sixth pin of the second control chip;
   wherein the storage unit is configured to store reference range data of the conversion voltage, the control unit is configured to read conversion voltage data of the third pin of the second control chip to match with the reference range data of the storage unit, and the conversion signal group is produced according to a matching result and output through the first pin, the fourth pin and the sixth pin of the second control chip.

2. The conversion device according to claim 1, wherein the output end comprises a first resistor, a second resistor and a third resistor, wherein the third resistor and the first resistor are connected in series, the first resistor is connected with a power supply anode, and the third resistor is connected with a power supply ground wire;
   wherein a monitoring point is arranged between the first resistor and the third resistor, one end of the second resistor is connected with the monitoring point, while the other end thereof is connected with the third pin of the second control chip.

3. The conversion device according to claim 1, wherein the recognition module is a resistance bridge circuit, comprising a sixth resistor, a seventh resistor, an eighth resistor and a ninth resistor;
   wherein the sixth resistor and the eighth resistor are connected in series, the sixth resistor is connected with the voltage regulator module, and the eighth resistor is connected with the fourth pin of the second control chip; the seventh resistor and the ninth resistor are connected in series, the seventh resistor is connected with the first pin of the second control chip, and the ninth resistor is connected with the sixth pin of the second control chip; and
   a first detection point is arranged between the sixth resistor and the eighth resistor, a second detection point is arranged between the seventh resistor and the ninth resistor, the first detection point is connected to a data line anode of the input end, and the second detection point is connected to a data line cathode of the input end.

4. The conversion device according to claim 1, wherein the voltage regulator module is an LDO voltage regulator circuit, the LDO voltage regulator circuit comprises a first capacitor, a second capacitor and a first control chip;
   wherein one end of the first capacitor is connected with the power supply anode of the said input end and an input pin of the first control chip respectively, while the other end thereof is connected with the power supply ground wire; and
   one end of the second capacitor is connected with the reference voltage and an output pin of the first control chip, while the other end thereof is connected with the power supply ground wire.

5. The conversion device according to claim 1, wherein the voltage regulator module is an LDO voltage regulator circuit, the LDO voltage regulator circuit comprises a first capacitor, a second capacitor and a first control chip,
   wherein one end of the first capacitor is connected with the power supply anode of the said input end and an input pin of the first control chip respectively, while the other end thereof is connected with the power supply ground wire; and
   one end of the second capacitor is connected with the reference voltage and an output pin of the first control chip, while the other end thereof is connected with the power supply ground wire.

6. The conversion device according to claim 2, wherein the voltage regulator module is an LDO voltage regulator circuit, the LDO voltage regulator circuit comprises a first capacitor, a second capacitor and a first control chip,
   wherein one end of the first capacitor is connected with the power supply anode of the said input end and an input pin of the first control chip respectively, while the other end thereof is connected with the power supply ground wire; and
   one end of the second capacitor is connected with the reference voltage and an output pin of the first control chip, while the other end thereof is connected with the power supply ground wire.

7. The conversion device according to claim 3, wherein the voltage regulator module is an LDO voltage regulator circuit, the LDO voltage regulator circuit comprises a first capacitor, a second capacitor and a first control chip,
   wherein one end of the first capacitor is connected with the power supply anode of the said input end and an input pin of the first control chip respectively, while the other end thereof is connected with the power supply ground wire; and one end of the second capacitor is connected with the reference voltage and an output pin of the first control chip, while the other end thereof is connected with the power supply ground wire.

8. The conversion device according to claim 4, further comprising a conversion joint, wherein the conversion joint is divided into a 5V gear converting head, a 9V gear converting head, a 12V gear converting head, a 14.5V gear converting head and a 20V gear converting head; the conversion joint is connected with the output end, and controls a numerical value of the conversion voltage output by the output end.

9. The conversion device according to claim 5, further comprising a conversion joint, wherein the conversion joint is divided into a 5V gear converting head, a 9V gear converting head, a 12V gear converting head, a 14.5V gear converting head and a 20V gear converting head, the conversion joint is connected with the output end, and controls a numerical value of the conversion voltage output by the output end.

10. The conversion device according to claim 6, further comprising a conversion joint, wherein the conversion joint is divided into a 5V gear converting head, a 9V gear converting head, a 12V gear converting head, a 14.5V gear converting head and a 20V gear converting head, the conversion joint is connected with the output end, and controls a numerical value of the conversion voltage output by the output end.

11. The conversion device according to claim 7, further comprising a conversion joint, wherein the conversion joint is divided into a 5V gear converting head, a 9V gear converting head, a 12V gear converting head, a 14.5V gear converting head and a 20V gear converting head, the conversion joint is connected with the output end, and controls a numerical value of the conversion voltage output by the output end.

* * * * *